United States Patent
Jadunandan

(10) Patent No.: US 10,977,425 B1
(45) Date of Patent: Apr. 13, 2021

(54) DYNAMIC RESOURCE REFRESH

(71) Applicant: Sprint Communications Company L.P., Overland Park, KS (US)

(72) Inventor: Kevin V. Jadunandan, Palm Bay, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 1066 days.

(21) Appl. No.: 13/802,365

(22) Filed: Mar. 13, 2013

(51) Int. Cl.
*G06F 40/14* (2020.01)

(52) U.S. Cl.
CPC ................................... *G06F 40/14* (2020.01)

(58) Field of Classification Search
CPC combination set(s) only.
See application file for complete search history.

(56) References Cited

U.S. PATENT DOCUMENTS

| | | | |
|---|---|---|---|
| 2004/0162071 A1* | 8/2004 | Grilli et al. | 455/435.1 |
| 2005/0149922 A1* | 7/2005 | Vincent | G06F 8/656 717/172 |
| 2005/0192922 A1* | 9/2005 | Edlund | G06F 17/3048 |
| 2008/0005661 A1* | 1/2008 | Yao | G06F 9/451 715/700 |
| 2008/0178003 A1* | 7/2008 | Eastham | H04L 9/0833 713/171 |
| 2009/0164592 A1* | 6/2009 | Arthursson | 709/206 |
| 2009/0254589 A1* | 10/2009 | Nair | G06F 17/30581 |
| 2009/0282096 A1* | 11/2009 | Kamrowski | H04L 67/16 709/203 |
| 2012/0096073 A1* | 4/2012 | Elwood | 709/203 |
| 2012/0303425 A1* | 11/2012 | Katzin et al. | 705/14.4 |
| 2013/0041974 A1* | 2/2013 | Luna et al. | 709/213 |
| 2013/0047034 A1* | 2/2013 | Salomon et al. | 714/18 |

OTHER PUBLICATIONS

Loreto, et al., Apr. 2011, IETF RFC for HTML, p. 3 (Year: 2011).*
Armstrong, Efficient and transparent dynamic content updates for mobile clients, Jun. 2006, MobiSys Conference on Mobile Systems, 4th Annual, pp. 56-68 (Year: 2006).*

* cited by examiner

*Primary Examiner* — Kavita Stanley
*Assistant Examiner* — Ahmad M El-Bkaily

(57) ABSTRACT

A mobile phone. The mobile phone comprises a radio frequency transceiver, memory, processor, and browser application stored in the memory. When executed by the processor, the browser application establishes persistent connection with a content site, downloads a page from the content site by radio frequency transceiver, wherein the web page comprises content and at least one of a style sheet and a script code, presents the page based at least in part on the style sheet and the script code, caches the style sheet and the script code, receives a notification from the content site that one of the style sheet or the script code has been updated, downloads at least one of the updated style sheet or the updated script code based on the notification, and presents the page based at least in part on the at least one of the updated style sheet or the updated script code.

16 Claims, 6 Drawing Sheets

DYNAMIC RESOURCE REFRESH

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network capable electronic devices are becoming increasingly prevalent in our daily lives. Additionally, more and more electronic devices that did not have network capabilities are getting network capable. With the rapid development and popularization of network capable electronic devices, a wide variety of web pages and web applications on the network capable electronic devices are growing more complex while getting more functionalities, and new web pages and web applications are developed and brought into use all the time. Web pages and web applications cache presentation related components to save latency and reduce network traffic. Some web pages and web applications cache more substantive content. When web pages or web applications at the server side update more often than the caching period at the client side, problems might occur. The web page or web application might only work partially, or completely not work. Users at the client side will have to refresh the web page or web application manually in order for the web page or web application to work properly, which may entail user interaction and/or introduce service interruption. The behavior of unnecessary user interaction or service interruption in the web pages and web applications and their impact on the user experience may have implications for user satisfaction with the network application provider and/or the network service provider.

SUMMARY

In an embodiment, a method of presenting content on a mobile phone is disclosed. The method comprises establishing a persistent connection with a web content site, downloading a web page from the web content site, wherein the web page comprises content and at least one of a style sheet and script code, presenting the web page based at least in part on the style sheet and the script code, caching the style sheet and the script code by a browser of the mobile phone, receiving a notification from the web content site that one of the style sheet or script code has been updated, requesting a refresh of the style sheet and/or script code in the background, downloading the style sheet and/or script code in the background after requesting the refresh of the style sheet and/or script code, and presenting the web page based at least in part on the at least one of the updated style sheet or the updated script code.

In an embodiment, a mobile phone is disclosed. The mobile phone comprises a radio frequency transceiver, a memory, a processor, and a browser application stored in the memory. When executed by the processor, the browser application establishes a persistent connection with a web content site, downloads a web page from the web content site via the radio frequency transceiver, wherein the web page comprises content and at least one of a style sheet and a script code, presents the web page based at least in part on the style sheet and the script code, caches the style sheet and the script code, receives a notification from the web content site that one of the style sheet or the script code has been updated, downloads at least one of the updated style sheet or the updated script code based on the notification, and presents the web page based at least in part on the at least one of the updated style sheet or the updated script code.

In an embodiment, a method of presenting content by an electronic device is disclosed. The method comprises establishing a persistent connection with a web content site using long polling, downloading a web page from the web content site, wherein the web page comprises content and at least one of a style sheet and script code, presenting the web page based at least in part on the style sheet and the script code, caching the style sheet and the script code by the electronic device, receiving a notification from the web content site that one of the style sheet or script code has been updated, downloading the style sheet and/or script code in the background, wherein the web page is refreshed a calculated time delay after receiving the notification, and presenting the web page based at least in part on the at least one of the updated style sheet or the updated script code.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
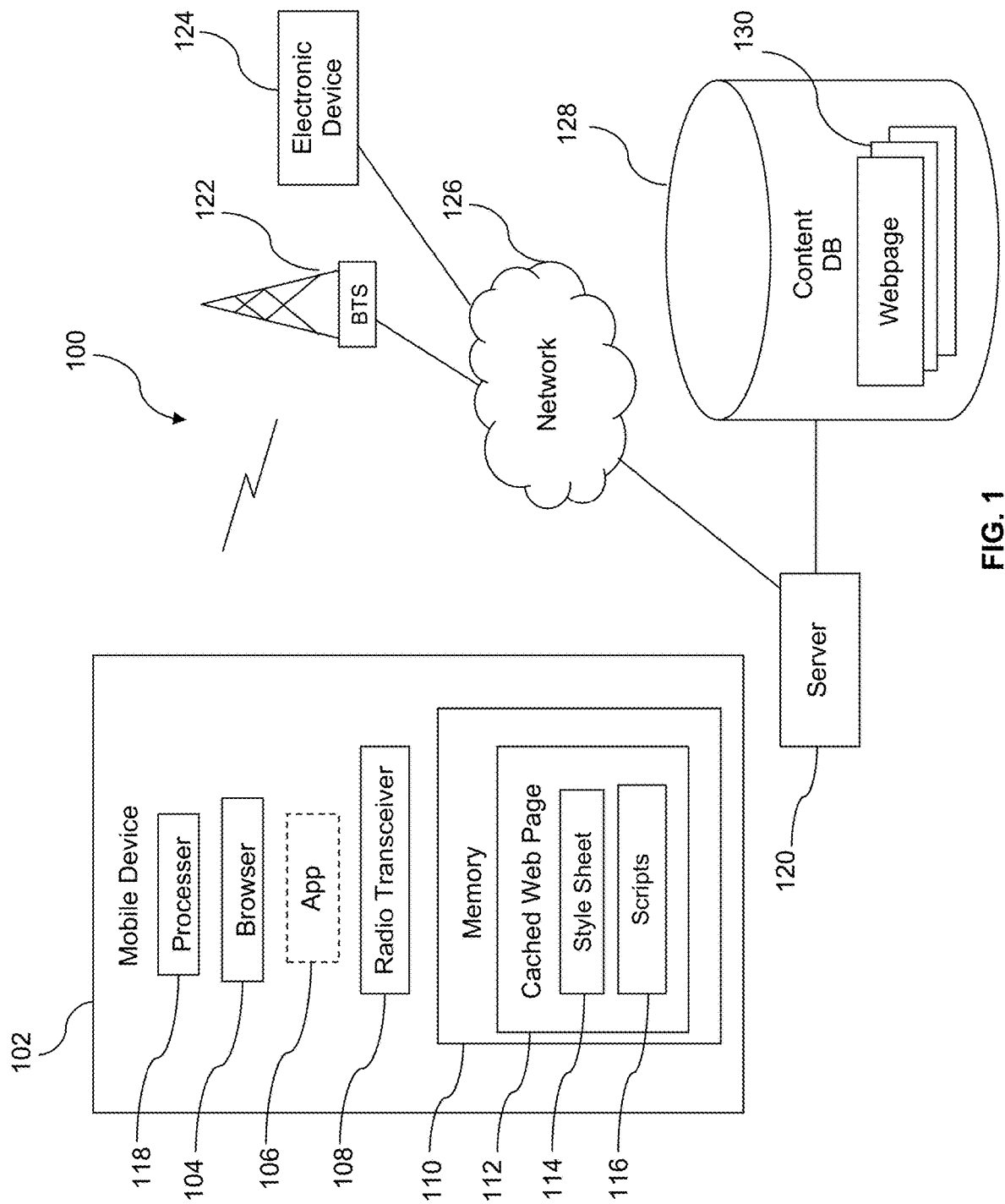
FIG. 1 is an illustration of a network system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may be caused by the way browsers reload web pages, specifically browsers cache some components of the web page and do not refresh those components when they reload the web page. For example, most of the current browsers pull down everything, including HyperText Markup Language (HTML) documents and HyperText Markup Language (HTML) tags, of a web page once and cache the images, script code and style sheets, and some other components. JavaScript and cascading style sheets (CSS) are suggested to be cached for up to a year. The browsers cache components of the web page to reduce latency and network traffic that occur when they reload the web page. The HyperText Markup Language (HTML) documents and/or HyperText Markup Language (HTML) tags are refreshed when the web page is reloaded. However, the browser may not download the cached components again until the cached components expire, unless the user refreshes the web page manually. When the script code or style sheet of the web page is updated at the website server, the web page at the client may not be displayed properly, or may not be displayed at all. This kind of problem occurs for most web pages/applications, and asynchronous JavaScript extensible markup language (AJAX) web pages have the worst problems. The present disclosure teaches a system and method for the content server to proactively send notices to all open browsers that have registered for available updates of the script code and/or style sheets and for the open browsers to update those components themselves without user interaction.

For example, an open browser may maintain a persistent connection to the content server(s) of the webpage(s) opened by the browser. Whenever the content server has some updates for either the script code or style sheets for that open browser, the content server sends a notice to the browser. The browsers that received the notices sleep for a calculated amount of time to avoid overloading the web content server. The browsers then download the updates of the web page in the background according to the update notice from the web content server. The web page is presented based at least in part on the updated script code or updated style sheets. The browser sends a new request for updates to the web content server after refreshing the web page, and so the persistent connection is maintained as long polling. Additionally, the browser and the server may work in a publish/subscribe pattern/paradigm, with the browser as a subscriber and the server as a publisher. The server as the publisher may classify resources into different classes. On the other hand, the browser as the subscriber may classify resources into classes also. The browser may subscribe to updates in only some of the classes of resources on the server. For example, when the browser is developed based on AJAX technologies, the browser may subscribe to resources on the server in the form of the style sheet and script code.

Turning now to FIG. 1, a communication system 100 is described. In an embodiment, the system 100 may comprise a plurality of mobile devices 102. The device 102 may comprise one or more processors 118, one or more browsers 104, a radio transceiver 108, a memory 110, and maybe one application 106. One or more cached web pages 112 comprising style sheets 114 and scripts 116 may be stored in the memory 110. The device 102 is configured to use the radio transceiver 108 to establish a wireless communication link with a base transceiver station 122, and the base transceiver station 122 provides communications connectivity of the device 102 to a network 126. The network may comprise any combination of private and public networks.

A server 120 is coupled to the network 126, for example a server 120 operated by a network service provider. The server 120 is also coupled to a content database 128. The server 120 and the content database 128 may locate in one computer—for example, a server computer, in two different computers—for example, a server computer for the server 120, and another computer for the content database 128, in multiple different computers—for example, multiple server computers for the server 120, and other multiple computers for the content database 128, or in some other combination of computers. The content database 128 stores the components of the current web pages 130, or the most recent version of the web pages 130. When the web pages 130 are updated with any new resource, the content database 130 may send a notice/message to the server 120 about the update. The server 120 then notifies the mobile device 102 about the update if it is needed.

Electronic devices 124 also have access to the network 126. The electronic device 124 may be any of a desktop computer, a laptop computer, a notebook computer, a tablet computer, a mobile phone, a personal digital assistant (PDA), a media player, a game console, an Internet digital media streaming device, or another electronic device. The electronic devices 124 may access the network 126 through wired or wireless access network. Note that some network capable electronic devices 124 may also have one or more browsers 104.

It is understood that the system 100 may comprise any number of mobile devices 102 and any number of base transceiver stations 122. The collectivity of base transceiver stations 122 may comprise a radio access network and provide a radio communication link to the mobile devices 102 to provide access to the network 126. The radio access network may be abstracted in different ways and may comprise, in addition to the base transceiver stations 122, servers and data storages such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile devices 102.

The radio transceiver 108 may communicate with the base transceiver station 122 using any of a variety of wireless communication protocols including a global system for mobile communication (GSM) wireless communication protocol, a code division multiple access (CDMA) wireless communication protocol, a long-term evolution (LTE) wireless communication protocol, a world-wide interoperability microwave access (WiMAX) wireless communication protocol, or another wireless communication protocol. The mobile device 102 may be any of a tablet computer, a mobile phone, a personal digital assistant (PDA), a portable media player, a portable game console, a portable Internet digital media streaming device, or another mobile device. In an embodiment, the mobile device 102 may have other components (not shown) such as a near field communication (NFC) radio transceiver, a wireless local area network (WLAN) radio transceiver, a world-wide interoperability microwave access (WiMAX) radio transceiver, or other components.

Mobile devices 102 and network capable electronic devices 124 cache webpages 112 to reduce latency when they reload webpages. Mobile devices 102 and network capable electronic devices 124 cache webpages 112 also to reduce network traffic. In an embodiment, the cached web page 112 may comprise images, the style sheets 114, the scripts 116, and other web page components. The web page in total comprises hypertext markup language, images, the style sheets 114, the scripts 116, and other components. The hypertext markup language takes care of the raw information on a web page, and the style sheets 114 and the scripts 116 control the appearance of the web page. The browser 104 may check any update and load automatically in the background when hypertext markup language changes without interrupting the user like most of existing web browsers. However, current browsers usually download all content when the web page is first loaded, and do not check for changes/updates in content other than content in hypertext markup language until the user manually reloads the web page. For example, current browsers usually cache the style sheets 114 and the scripts 116, and do not load it again until the user of the browser 104 shift-reloads or full-reloads the web page. Updates may be pushed every few days at the server 120 while webpages 112 at the mobile device 102 may be cached for up to 30 days or longer. When new features are added or resources in the style sheets 114 and/or the scripts 116 are updated at the webpages 130 in the database 128, the browser 104 may not work properly or may not work at all because the browser 104 did not update the style sheets 114 or the scripts 116.

A browser 104 may be any of Chrome, Firefox, Internet Explorer, Opera, Safari, Dolphin browser, Android browser, or another web/mobile browser. The browser 104 may be stored in the memory 110 and executed by the processor 118. In an embodiment, the browser 104 may be developed based on any of a variety of client-side web development technologies, for example, HyperText Markup Language (HTML), Asynchronous JavaScript Extensible Markup Language (AJAX), Flash, JavaScript, jQuery, or another client-side web development technology. The browser 104 may retrieve and present information, for example, text, images, audio, video, or some other kind of content, on the World Wide Web (WWW or W3). The browser 104 may also allow a user to access other information resources on the World Wide Web, for example, through hyperlinks. Additionally, the browser 104 may transfer files with file prefixes that the browser 104 cannot handle to another application, and download a file if the browser encounters an unsupported type of file or a file that is configured to be downloaded. The browser 104 may provide access to content on remote servers as well as to local files. The web browser 104 may be utilized by a web application to interpret the web application, display the user interface, and provide interactive services.

When the browser 104 loads a web page, the resources the browser 104 downloads from a web page/app can be mainly classified into three kinds: hypertext markup language (html), script code, and style sheet, and other kinds of components of a web page/app. The server 120 and the web browser 104 may work in a publish/subscribe pattern/paradigm. For example, the server 120 may work as a publisher, and the browser 104 may work as a subscriber. For example, the server 120 may serve as a publisher for resources of a web page/app, and classify information/resources into different classes. The server 120 publishes resources without knowledge of what, if any, subscribers there are. Alternatively, the browser 104 may be responsible for classifying information/resources, depending on how the browser 104 and the server 120 cooperate. The browser 104 subscribes to one or more classes of the resources on the server 120 without the knowledge of what, if any, publishers there are. The resources that the browser 104 subscribes to may reside in the server 120 or the content database 128. When the resources that the browser 104 subscribes to are located in the content database 128, the server 120 may publish the resources. In this case, the server 120 may serve as a broker between the browser 104 and the content database 128 by filtering, storing, and forwarding resources.

The publisher, the server 120 and the subscriber, the browser 104 may each continue to operate normally regardless of the other. For example, if the server 120 stops running, the browser 104 may still receive backlogged new resources. Additionally, if the browser 104 stops running, the server 120 may still publish new resources. When the browser 104 comes back to normal operation, the browser 104 may receive subscribed resources from the server 120.

The browser 104 may register with one or more web applications for updates. The browser 104 may subscribe to a subset of the total resources published by the server 120 for the web application the browser 104 registered for updates with. In an embodiment, when the browser 104 is developed based on AJAX technologies, the browser 104 subscribes to resources in the form of the style sheets 114 and the scripts 116 since resources in hypertext markup language format is usually updated every time when the browser 104 reloads the web page. For example, when new resources of style sheets 114 and/or the scripts 116 are updated on the web pages 130 in the content database 128, the server 120 may be notified and may publish the new resources. The browser 104 will then receive the new resources of style sheets 114 and/or the scripts 116.

In an embodiment, the browser 104 maintains a persistent connection to the server 120, and the browser 104 is always listening as long as the browser 104 is open. The persistent connection that the browser 104 maintains with the server 120 is the channel for the server 120 to communicate with the browser 104 when there is any update available for the open browser 104. When the browser 104 is open, the browser 104 may be active, for example, in the foreground, not minimized, or without the user having switched to another browser, another browser window, or another browser tab. Additionally, when the browser 104 is open, the browser 104 may also be inactive, for example, in the background, minimized, or with the user having switched to another browser, another browser window, or browser tab. As long as the browser 104 is open and no matter whether the browser 104 is active or inactive, the server 120 may communicate with the browser 104 about associated updates through the persistent connection between the browser 104 and the server 120.

For example, when updates for the style sheets 114 and the scripts 116 are available at the content database 128, the server 120 may send a notice/message to all the open browsers 104 that have registered for updates in the style sheets 114 and/or the scripts 116. Additionally, the server 120 may also request the open browsers 104 not to respond to the server 120 immediately after the open browsers 104 receive the notice about new resources in the style sheets 114 and/or the scripts 116. The open browsers 104 may delay/sleep for a period of time after receiving the notice from the server 120 about new resources in the style sheets 114 and/or the scripts 116. For example, each browser 104 may randomly choose a time interval from a range of time intervals, for example, from 1 to 30 seconds, from 1 to 60 seconds, from 1 to 120 seconds, or some other range of time intervals. The random delay/sleep of the browsers 104 may reduce the risk for the server 120 of receiving too many requests from the browsers 104 at the same time, and so overloading the server 120 may be avoided.

After the random delay/sleep, the open browsers 104 may then send a message to the server 120 requesting resource changes/updates of the style sheets 114 and/or the scripts 116. For example, if the web page is developed based on AJAX technologies, the browser 104 may send an AJAX-style request to the server 120. The request that the AJAX-based browser 104 sent may be a long polling request, and it will be kept open until the server 120 has new resources for the browser 104. When the server has new resources from the content database 128 to be sent to the browser 104, the server 120 sends the new resources for the style sheets 114 and/or the scripts 116 in a complete response to the browser 104. The browser 104 incrementally downloads updates in the style sheets 114 and/or the scripts 116 in the background. The browser 104 may download the refreshed web page while the browser 104 is inactive. The app 106 may be the application, instead of the browser 104, that receives the notification from the server 120 and downloads the refreshed web page while the web browser is inactive. The browser 104 then sends a new long polling request to the server 120 so that the browser 104 will be notified when new resources are available at the content database 128 again. This way, the web page at the browser 104 may stay consistent with the webpage 130 on the content database 128, which is the latest version of the webpage. Note that long polling is resource efficient. Before long polling, for every polling cycle, for example every few seconds, the browser might send a request asking for updates and that were a lot of queries in total to the database. When long polling is in use, database queries, link establishments, and link disconnects are lowered.

The communication between the browser 104 and the server 120 about the resource updates and resources downloading may be completed in the background without user interaction, and thus no interruption is generated. AJAX web pages put more substantive content in the style sheets 114 and the scripts 116, and so it is desirable to keep the style sheets 114 and the scripts 116 current. The mobile device 102 and the server 120 may achieve the communication between the browser 104 and the server 120 about the resource updates and resources downloading by deploying Nginx push/Comet, which is long polling technology in a web/AJAX context, at the server 120 side. At the client side, or the browser 104/the mobile device 102 side, JavaScript framework may be implemented.

Figure 2:
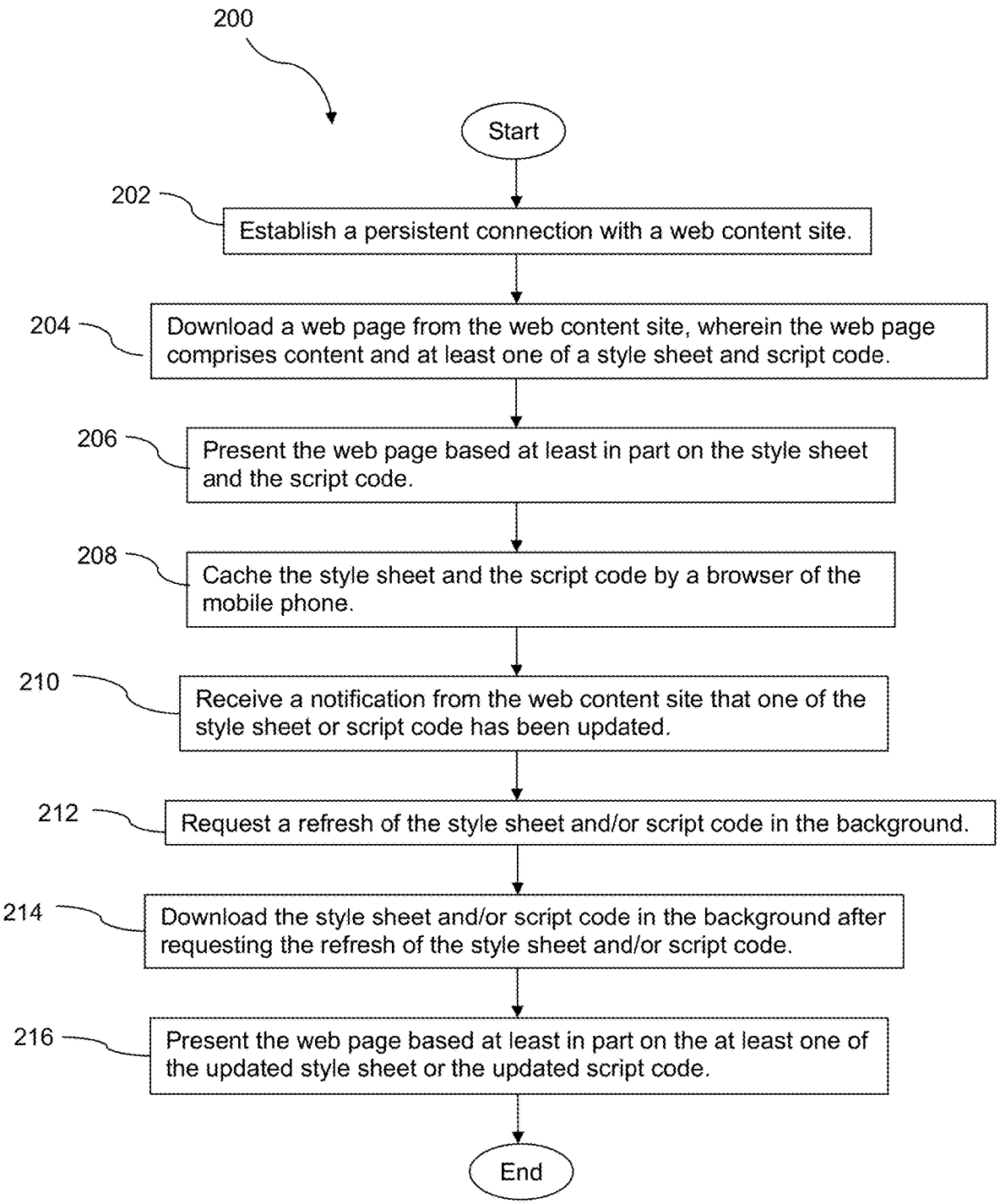
FIG. 2 is a flow chart illustrating a method according to an embodiment of the disclosure.

Turning now to FIG. 2, a method 200 is described. At block 202, a persistent connection is established between a client and a web content site. For example, the mobile device 102 or the network capable electronic device 124 may establish a persistent connection with the server 120 that is the server for the website or web application that the mobile device 102 or the network capable electronic device 124 is interested in. In an embodiment, when the persistent connection is established, the browser 104 is always listening as long as the browser 104 is open. The persistent connection that the browser 104 maintains with the server 120 is the channel for the server 120 to communicate with the browser 104 when there is any update available for the open browser 104.

At block 204, a web page is downloaded from the web content site, wherein the web page comprises content and at least one of a style sheet 114 and script code 116. For example, when a browser 104 loads a webpage for the first time, every component of the webpage is downloaded for the first time including the content, such as text, images, or other content, and the presentation comprising at least one of a style sheet 114 and script code 116. At block 206, the web page is presented based at least in part on the style sheet 114 and the script code 116. The style sheet 114 and script code 116 are the presentation control components of a web page, and the web page is presented based at least on one of the style sheet 114 and the script code 116. At block 208, the style sheet 114 and the script code 116 are cached by a browser 104 of the mobile device 102. Note that the style sheet 114 and the script code 116 may also be cached by a browser 104 of a network capable electronic device 124. The style sheet 114 and the script code 116 are cached so that latency and network traffic can be reduced when the web page is loaded again.

At block 210, a notification is received at the mobile device 102 from the web content site that one of the style sheet or script code has been updated. For example, the server 120 may send a notice/message to the mobile device 102 or the network capable electronic device 124 about the update of the style sheet 114 and/or script code 116. At block 212, the mobile device 102 requests a refresh of the style sheet 114 and/or script code 116 in the background. After receiving the notice about the update of the style sheet 114 and/or script code 116, the mobile device 102 sends a request for a refresh of the style sheet 114 and/or script code 116 in the background. At block 214, the mobile device 102 downloads the style sheet 114 and/or script code 116 in the background after requesting the refresh of the style sheet 114 and/or script code 116. The process of requesting for updated resources and downloading resources between the browser 104 and the server 120 may be completed in the background without user interaction, and thus no interruption is generated. For example, the mobile device 102 incrementally downloads the updates of the style sheet 114 and/or script code 116 in the background. The mobile device 102 may not download again unchanged parts of the cached style sheet 114 or the cached script code 116. At block 216, the web page is presented based at least in part on one of the updated style sheet 114 and the updated script code 116. After downloading the update of the style sheet 114 and/or script code 116, the entire web page is presented by the browser 104.

Figure 3:
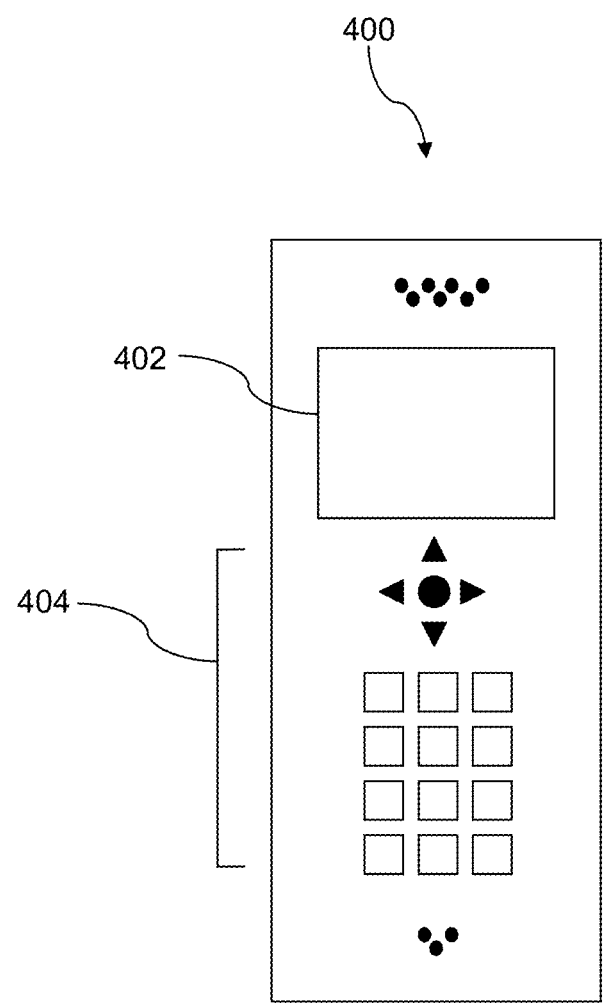
FIG. 3 is an illustration of a mobile communication device according to an embodiment of the disclosure.

FIG. 3 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 4:
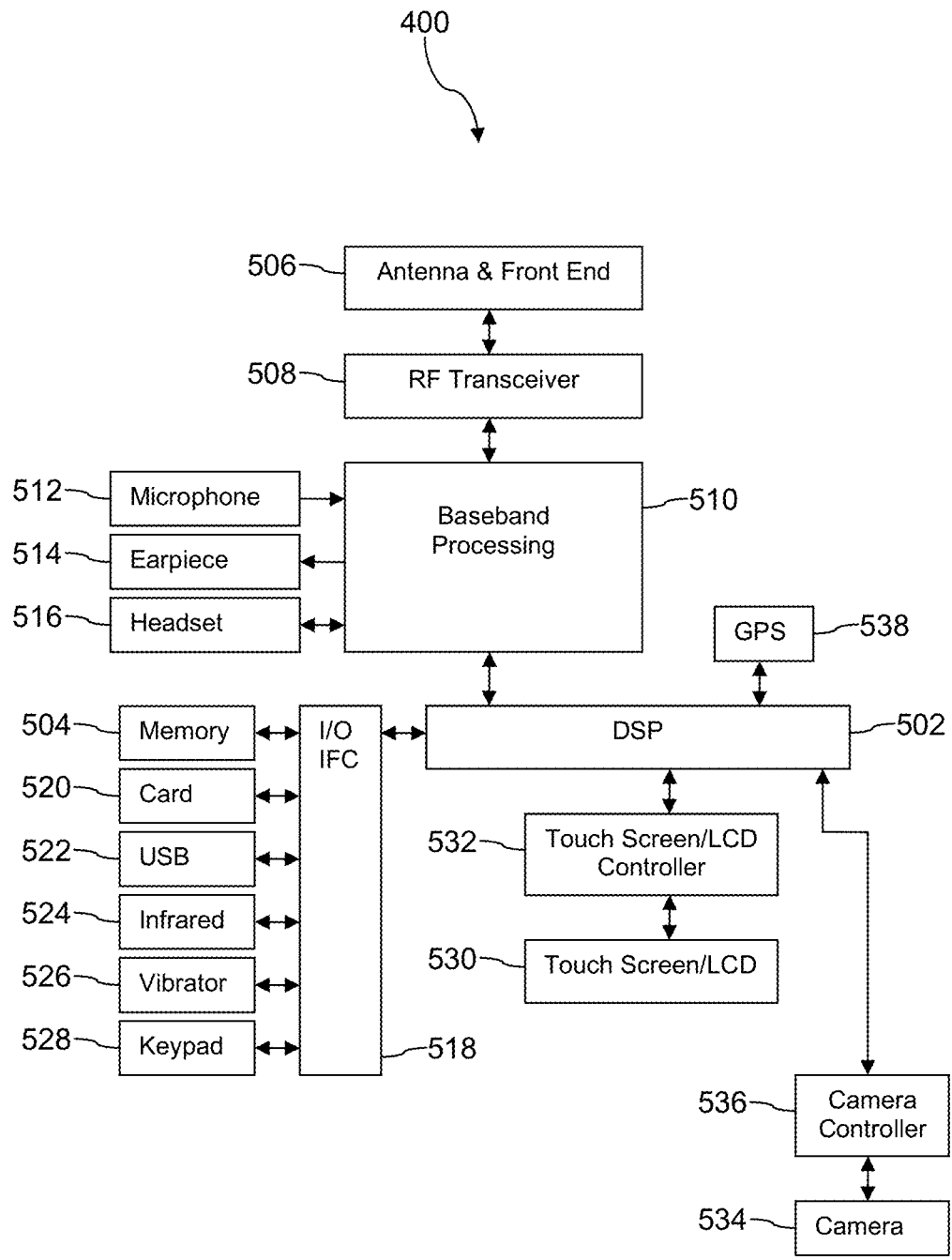
FIG. 4 is a block diagram of a mobile communication device according to an embodiment of the disclosure.

FIG. 4 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 5A:
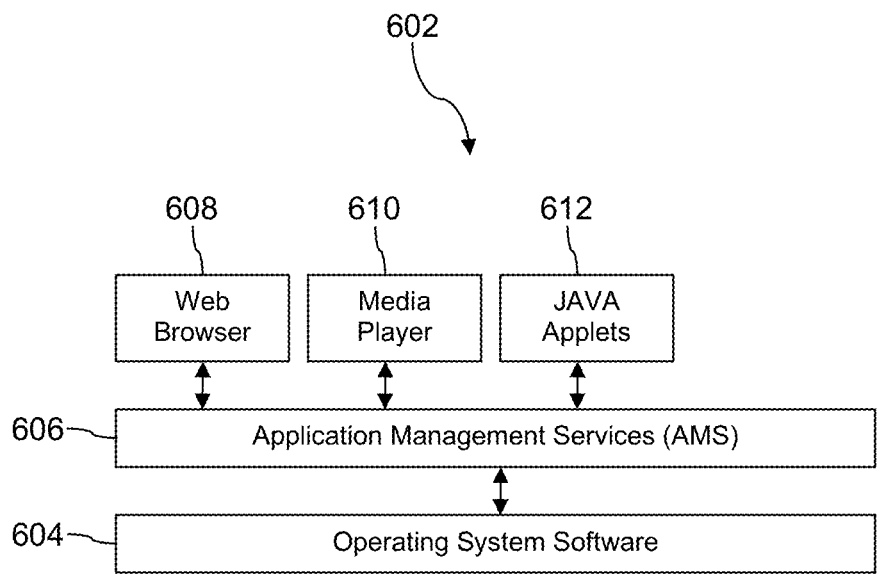
FIG. 5A is a block diagram of a software architecture of a mobile communication device according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 5A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 5B:
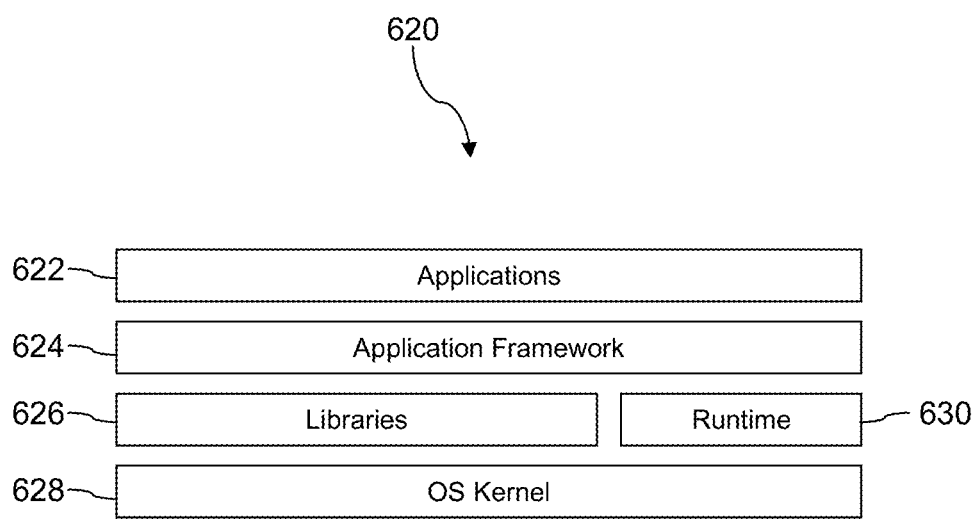
FIG. 5B is a block diagram of another software architecture of a mobile communication device according to an embodiment of the disclosure.

FIG. 5B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
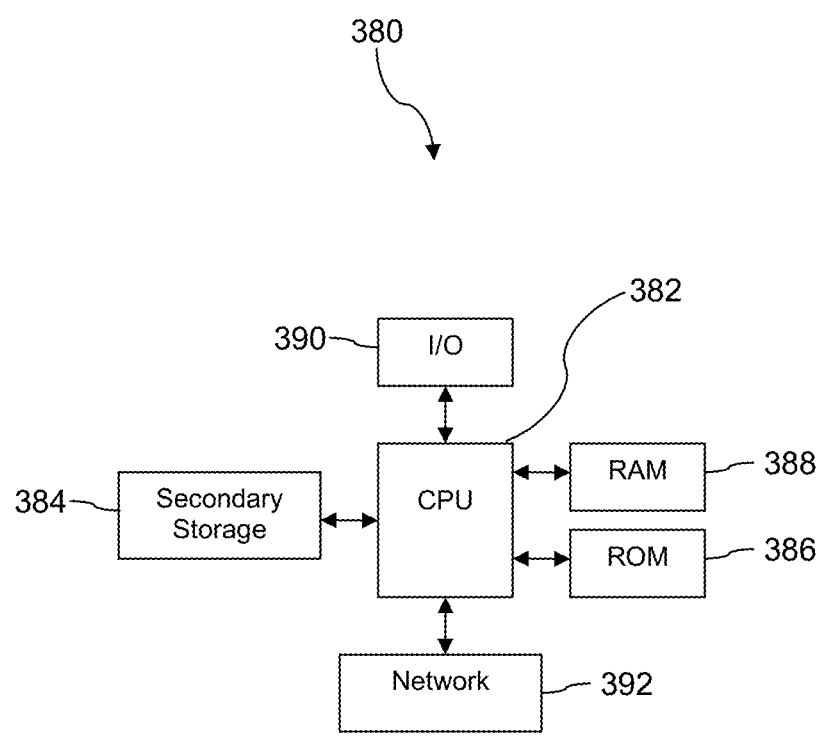
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of presenting content on a mobile device, comprising:
    establishing, via a browser stored in non-transitory memory of the mobile device, a persistent connection with a network provider server in communication with a web content server that is associated with a web content site, wherein the persistent connection is via a wireless network and maintained by the browser while the browser is open; and
    while the open browser executes scripts maintaining the persistent connection:
        downloading a web page from the web content server to the mobile device, wherein the web page comprises content, a style sheet, and a script code;
        presenting, via the open browser, the web page based at least in part on the style sheet and the script code;
        caching, via the open browser, the style sheet and the script code on the mobile device;
        receiving, by the open browser from the network provider server via the persistent connection between the open browser and the network provider server, a notification that the style sheet has been updated at the web content server without user interaction on the mobile device, wherein the notification is subsequent to the caching on the mobile device, and wherein the notification includes a request for the open browser not to respond to the notification that the style sheet has been updated at the web content server for a period of time;
        delaying response to the notification that the style sheet has been updated at the web content server for a delay period responsive to receipt of the request for the open browser not to respond for the period of time, wherein the delay period is a random amount of time selected from a predefined range of time intervals;
        requesting, by the open browser from the network provider server via the persistent connection between the open browser and the network provider server at an expiration of the delay period, a refresh of the style sheet of the webpage presented, wherein requesting occurs in the background of the mobile device;
        downloading, by the open browser from the network provider server via the persistent connection between the open browser and the network provider server, the style sheet that has been updated, wherein the downloading occurs in the background of the mobile device after requesting the refresh of the style sheet;
        updating, by the open browser, the web page with the style sheet that has been updated and downloaded via the persistent connection without interruption to a user of the mobile device and without a manual reload of the web page;
        presenting, by the open browser, the web page based at least in part on the style sheet that is updated; and
        sending, by the open browser to the web content server without user interaction, a new request for updates to the style sheet or the script code to maintain the persistent connection in response to updating the web page.

2. The method of claim 1, wherein the persistent connection is based on use of long polling.

3. The method of claim 1, further comprising: determining that the browser presenting the web page is inactive, wherein the downloading of the refresh of the style sheet occurs while the browser is inactive.

4. A mobile device comprising:
    a radio frequency transceiver;
    a non-transitory memory;
    a processor communicatively coupled with the non-transitory memory;
    a browser application stored in the non-transitory memory that, upon execution by the processor, configures the processor to:
        establish a persistent connection with a network provider server, download a web page from a web content server via the radio frequency transceiver, wherein the web page comprises content, a style sheet, and a script code, and wherein the style sheet and the script code control the appearance of the webpage,
        present the web page on the mobile device based at least in part on the style sheet and the script code,
        cache the style sheet and the script code associated with the web page received from a web content database,
        receive, without user interaction and while the browser is open on the mobile device, a notification from the network provider server that at least one of the style sheet or the script code has been updated at the web content server, wherein the notification is received during the persistent connection, and wherein the notification includes a request for the browser not to respond to the notification that at least one of the style sheet or the script code has been updated at the web content server for a period of time;

delaying response to the notification that at least one of the style sheet or the script code has been updated at the web content server for a delay period responsive to receipt of the request for the open browser not to respond for the period of time, wherein the delay period is a random amount of time selected from a predefined range of time intervals, download, from the network provider server using the persistent connection at an expiration of the delay period, the at least one of the updated style sheet or the updated script code, wherein the download is based on the notification, update the webpage with the at least one of the style sheet or the script code that has been updated, present the web page based at least in part on the at least one of the style sheet or the script code that has been updated, and send, to the web content server without user interaction, a new request for updates to the style sheet or the script code to maintain the persistent connection in response to updating the web page.

5. The mobile device of claim 4, wherein the radio frequency transceiver is configured to provide radio communications based on at least one of code division multiple access, global system for mobile communication, long term evolution, or worldwide interoperability for microwave access wireless communication protocols.

6. The mobile device of claim 4, wherein the persistent connection is based on use of long polling by the mobile device.

7. The mobile device of claim 6, wherein the browser application further configures the processor to:
maintain the persistent connection with the web content server based on use of long polling; and
request the at least one of the style sheet or the script code that has been updated from the web content server.

8. A method of presenting content by an electronic device, comprising:
establishing, by the electronic device via long polling, a persistent connection with a network provider server in communication with a web content server, wherein the persistent connection is via a wireless network and maintained by a browser while the browser is open;
while the open browser executes scripts while maintaining the persistent connection:
downloading, via the electronic device, a web page from the web content server, wherein the web page comprises content and a style sheet;
presenting, via the open browser on the electronic device, the web page based at least in part on the style sheet;
caching the style sheet on the electronic device;
receiving, by the open browser from the network provider server via the persistent connection between the open browser and the network provider server, a notification from the web content server that the style sheet has been updated at the web content server without initiation from user interaction, wherein the notification includes a request for the open browser not to respond to the notification from the web content server that the style sheet has been updated at the web content server for a period of time;
delaying response to the notification from the web content server that the style sheet has been updated at the web content server for a delay period responsive to receipt of the request for the open browser not to respond for the period of time, wherein the delay period is a random amount of time selected from a predefined range of time intervals;
based on the notification, downloading in the background, by the open browser from the network provider server via the persistent connection between the open browser and the network provider server at an expiration of the delay period, the style sheet that has been updated from the network provider server, wherein the downloading occurs after passage of a calculated time interval that delays initiation of the downloading;
in response to the downloading, updating, on the electronic device by the open browser, the web page with the style sheet that has been updated;
responsive to the updating, presenting, on the electronic device by the open browser, the web page based at least in part on the style sheet that has been updated; and
sending, by the open browser to the web content server without user interaction, a new request for updates to the style sheet to maintain the persistent connection in response to updating the web page.

9. The method of claim 8, further comprising:
maintaining, by the electronic device via long polling, the persistent connection during presentation of the web page on the electronic device, and
sending, by the electronic device to the network provider server, a request for the style sheet that has been updated.

10. The method of claim 8, wherein a web browser receives the notification from the network provider server without interruption to a user of the electronic device, and wherein the updating the web page occurs while presenting the webpage on the electronic device.

11. The method of claim 8, wherein the downloading occurs while the open browser is inactive on the electronic device.

12. The method of claim 8, wherein the electronic device is one of a mobile device, a media player, and a personal digital assistant (PDA).

13. The method of claim 8, wherein the electronic device is one of a laptop computer, a notebook computer, a tablet computer, or a desktop computer.

14. The method of claim 8, wherein the network provider server sends the notification to all electronic device with open browsers that have registered for updates in the style sheet via persistent connections between each of the electronic devices and the network provider server without initiation from user interaction.

15. The method of claim 1, further comprising:
while the open browser executes scripts maintaining the persistent connection:
receiving, by the open browser from the network provider server via the persistent connection between the open browser and the network provider server, a notification that the script code has been updated at the web content server without user interaction on the mobile device, wherein the notification is subsequent to the caching on the mobile device;
requesting, by the open browser from the network provider server via the persistent connection between the open browser and the network provider server, a refresh of the script code of the webpage presented, wherein requesting occurs in the background of the mobile device;

downloading, by the open browser from the network provider server via the persistent connection between the open browser and the network provider server, the script code that has been updated, wherein the downloading occurs in the background of the mobile device after requesting the refresh of the script code;

updating, by the open browser, the web page with the script code that has been updated and downloaded via the persistent connection without interruption to a user of the mobile device and without a manual reload of the web page; and presenting, by the open browser, the web page based at least in part on the script code that is updated.

16. The method of claim 1, wherein the style sheet and the script code control the appearance of the webpage.

\* \* \* \* \*